United States Patent [19]
Gerstenfeld et al.

[11] Patent Number: 4,979,137
[45] Date of Patent: Dec. 18, 1990

[54] AIR TRAFFIC CONTROL TRAINING SYSTEM

[75] Inventors: Arthur Gerstenfeld, Newton; Michael N. Gualtieri, Boxford; Thomas D. Moody, Reading, all of Mass.

[73] Assignee: UFA, Inc., Mass.

[21] Appl. No.: 176,639

[22] Filed: Apr. 1, 1988

Related U.S. Application Data

[63] Continuation-in-part of Ser. No. 931,867, Nov. 18, 1986, Pat. No. 4,827,418.

[51] Int. Cl.$^5$ ............................................. G06F 15/48
[52] U.S. Cl. ................................... 364/578; 364/439; 364/513
[58] Field of Search ............... 364/200, 900, 300, 513, 364/578, 439

[56] References Cited

U.S. PATENT DOCUMENTS

| | | | |
|---|---|---|---|
| 3,775,767 | 11/1973 | Fielding | 364/439 |
| 4,063,037 | 12/1977 | Strayer | 364/439 |
| 4,104,512 | 8/1978 | Strayer | 364/439 |
| 4,649,388 | 3/1987 | Atlas | 342/26 |
| 4,706,198 | 11/1987 | Thurman | 364/439 |

OTHER PUBLICATIONS

Steeb, "Distributed Intelligence for Air Fleet Control," Abstract, 1981, Rand Corp., Interim Report.
Chrisley, "Air Traffic Controller Aids for Planning of Aarrival Traffic–an AI approved," abstract, Aug. 87.
Cross, "Computer Understanding of Air Traffic Control Displays", abstract, IEEE Trans. on Systems, 1/85, Man and Cybernetics, p. 133.
Niedringham, "Automated Enroute Air Traffic Control Algorithmic Specifications", abstract, Federal Aviation Administration, 1983.
Andriole, "Applications in Artificial Intelligence," 9/1985, pp. 501–503.
Hayes-Roth, "The Knowledge-Based Expert System: A Tutorial," 9/84, pp. 11–28, Computer, vol. 17, No. 9.
Hartzband, "Enhancing Knowledge Representation in Engineering Databases," 9/85, pp. 37–48, Computer.
Tobias, "Time-Based Air Traffic Management using Expert Systems," Aerodynamics abstracts, p. 2988, 4/56.
Findler, "Air Traffic Control: A Challenge for Artificial Intelligence," 1/87, pp. 59–66, AI Expert.

*Primary Examiner*—Thomas G. Black

[57] ABSTRACT

An air traffic control training system and method for interacting with a user, the system and method generating a representation of at least one moving aircraft having an initial position and heading for producing a dynamic simulation of an air traffic scenario. Controller commands issued by a user are entered for altering the air traffic scenario. Rules and procedures stored in a knowledge base are compared to the present state of the simulation of the air traffic scenario or to the controller command by an expert system for issuing a warning upon the immediate or foreseeable failure to observe any rule or procedure in the knowledge base.

43 Claims, 9 Drawing Sheets

AIR TRAFFIC CONTROL TRAINING SYSTEM

RELATED APPLICATION

This application is a continuation-in-part of U.S. Pat. application Ser. No. 931,867 now U.S. Pat. No. 4,527,418, filed Nov. 18, 1986, entitled "Expert System for Air Traffic Control and Controller Training", by Arthur Gerstenfeld.

FIELD OF INVENTION

This invention relates to an air traffic control training system and, more particularly, to a training system that simulates dynamic air traffic scenarios and automatically provides feedback to a student to instruct the student in actual air traffic control rules and procedures.

BACKGROUND OF INVENTION

At the present time, it requires four or five years to train air traffic controllers. The bulk of this time is spent on the job under the supervision of instructors. The length of time required for on-the-job training is primarily attributed to the limited number of available air traffic controllers that can spend the proper amount of time to tutor students on a variety of different conditions. The controllers must teach students to be responsible for controlling all aircraft located in their radar sector, which defines a geographic region. Aircraft which fly from one sector to another must be properly transferred from the control of one controller to another. This is known as a handoff, and it is the responsibility of the separate controllers to resolve potential problems. Thus teamwork is an important aspect of the training.

Students must also be taught to monitor dozens of arriving and departing flights under numerous types of traffic and weather conditions. Students must learn to keep track of each aircraft's heading, altitude, and speed while anticipating each aircraft's future flight path to sequence instructions intelligently and to avoid collisions. In addition, there are numerous rules and procedures, such as site-specific letters of agreements and standard operating procedures, which must be learned to ensure traffic safety. Consideration must also be given to safe and timely departures and arrivals, fuel economy, and noise pollution.

In an attempt to reduce the on-the-job training time of air traffic controllers and improve the one-to-one student/instructor ratio, off-the-job training facilities have been established. These facilities are equipped with essentially the same radar equipment as that used by experienced controllers, which requires them to be linked to a main computer at a local airport. One of the problems facing these facilities is that this radar equipment is extremely expensive, so availability is often limited. There is also a temptation to use this training equipment for actual air traffic control when the equipment used by air traffic controllers breaks down. Another concern is that students may be trained on equipment that may soon become obsolete.

Off-the-job practice sessions at these facilities typically include simple air traffic scenarios generated on the students' radar display. These scenarios usually involve complex programs which are stored in the main computer. Access to these programs is often interrupted during times when air traffic is heavy because students are directly competing with experienced controllers for computer time.

Once a scenario has been generated, students may practice giving clearances to aircraft projected on their radar displays by verbally communicating with another person acting as a pseudo-pilot. The pseudo-pilot in each case responds to the verbal commands or clearances of a student controller by entering the commands into the computer by way of a keyboard. In complex situations, two pseudo-pilots may be necessary to respond to the verbal commands of a single student controller. During a different learning session, the roles of the student controllers and the pseudo-pilots are interchanged. In learning sessions without an instructor present, students are generally limited by their current knowledge of the numerous rules and procedures.

SUMMARY OF INVENTION

It is therefore an object of this invention to provide an automated air traffic control training system which interacts with a student to simulate air traffic scenarios while providing expert instruction to the student.

It is a further object of this invention to provide an automated air traffic control training system which interacts with a student for teaching the responsibilities of managing one or more aircraft.

It is a further object of this invention to provide such a system for producing a dynamic simulation of an air traffic scenario that can be varied for teaching different safety procedures.

It is a further object of this invention to provide such a system that simulates the actual equipment used by air traffic controllers.

It is a further object of this invention to provide a system which operates independently of the actual equipment, thereby making that equipment available full-time for actual use.

It is a further object of this invention to provide such a system which makes more time available for students to practice and learn on their own.

It is a further object of this invention to provide such a system which provides different levels of training exercises.

It is further an object of this invention to provide such a system that accelerates the air traffic control training program.

It is further an object of this invention to provide such a system which reduces on-the-job training.

It is a further object of this invention to provide a system that allows a refresher course for skilled air traffic controllers.

It is further an object of this invention to provide a system that simulates responses from aircraft pilots for acknowledging a student's clearance command and then executes the command.

It is a further object of this invention to provide a system which provides a verbal response for informing the student when a rule or procedure has been violated.

It is a further object of this invention to provide such a system which stores an entire student session and permits replay of the session.

It is a further object of this invention to provide a network system that interconnects several air traffic control training systems to enable a number of students to interact for developing a teamwork environment between the students.

It is a further object of this invention to provide such a network system that allows an instructor to supervise multiple students.

It is a further object of this invention to provide a network which enables students to train on different scenarios simultaneously.

It is a further object of this invention to provide such a network system that enables an instructor to change the scenario conditions, including air traffic and weather conditions, of any of the training systems.

This invention results from the realization that a truly effective automated training system for air traffic controller students can be achieved by generating realistic scenarios for the students, providing control to change the flight pattern of one or more aircraft, overseeing the actions of the students, and evaluating their actions using a compare module to instruct and provide feedback to the students in actual air traffic control rules and procedures.

This invention features an air traffic control training system which interacts with a user. The system includes means for generating a representation of at least one moving aircraft having an initial position and heading for producing a dynamic simulation of an air traffic scenario. This means for generating may include a simulated radar display for displaying the dynamic simulation. The training system also includes means for entering a controller command from the user for altering the air traffic scenario. An expert system is provided for comparing the rules and procedures stored in a knowledge base to the present state of the simulation of the air traffic scenario or to the controller command for issuing the warning upon the immediate or foreseeable failure to observe any rule or procedure. The expert system may also comment on the student's technique, such as excessive separation distance between aircraft. The means for display may further include means for generating an inset for displaying the warning issued by the expert system on the means for displaying the dynamic simulation. The warning issued may include a warning message and an explanation of that warning message within the inset. In the alternative, a verbal alert may be generated by the expert system by means which inform the user that a rule or procedure has been violated, or poor technique used. The means for generating may further include a control panel means and instrument means for enabling control of the means for displaying the air traffic scenario and for simulating the controls present in a work environment of the air traffic controller.

A pseudo-pilot means, which is interconnected to the means for generating, may be included for responding to verbal commands issued by the user for altering the air traffic scenario. The pseudo-pilot means may include voice recognition means for electronically responding to verbal commands issued by the user to alter the air traffic scenario or a terminal having a touch-sensitive screen for entering the controller command by a person responding to the user's verbal commands. The pseudo-pilot means may also include a voice-synthesizing means controlled by the expert system for verbally acknowledging controller commands.

The system may further include storage means for storing the dynamic simulation of the air traffic scenario together with all of the controller commands as they are issued by the user during the simulation and the warnings issued by the expert system. The system may further include a clock means for generating time increments to index the generated air traffic scenario and means for representing the generated time increments within an inset on the means for displaying the scenario. The storage means may be responsive to the means for generating for storing the air traffic scenario and for addressing a selected time increment for replaying the scenario on the means for displaying. The means for generating may further include means for advancing the air traffic scenario to a predetermined future time.

In another embodiment, an air traffic control which allows a user to interact with the system includes at least one training unit and an expert system for comparing rules and procedures stored in a knowledge base to the present state of the simulation of the air traffic scenario or to the controller command for issuing a warning upon the immediate or foreseeable failure to observe any rule or procedure in the knowledge base. The training unit consists of a means for generating a representation of at least one moving aircraft having an initial position and heading for producing a dynamic simulation of a selected air traffic scenario. Means are also provided for displaying the dynamic simulation and for entering a control command from the user for altering the air traffic scenario.

The system may also include a plurality of training units and a supervisor unit, interconnected to the plurality of units by a network bus. The supervisor unit includes means for selectively displaying the air traffic scenario selected at each of said plurality of training units. The supervisor unit may also include means for entering a supervisor command for altering the air traffic scenario displayed on the means for displaying at one or more of the plurality of training units. Warnings issued at any of the plurality of training units which may be displayed within an inset generated by means for generating may be detected by the supervisor unit.

The system may also include pseudo-pilot means interconnected to said means for generating for responding to verbal commands issued by the user for altering the air traffic scenario. The pseudo-pilot may include voice recognition means for electronically responding to verbal commands issued by the user for altering the air traffic scenario or a touch-sensitive screen for entering the controller commands by a person responding to the verbal commands issued by the user. The system may also include voice-synthesizing means controlled by the expert system for verbally acknowledging controller commands issued by the user.

The system may also include means for generating an inset on the means for displaying the air traffic scenario for displaying a generated measurement of time that indexes the generated air traffic scenario in time increments. Storage means may be included which are responsive to the clock means for storing the air traffic scenario time increments and further include means for addressing a selected time increment to replay the scenario on the means for displaying.

In another embodiment, the air traffic control training system which permits a user to interact with the system includes a training unit, a knowledge base for storing rules and procedures, and an expert system which compares rules and procedures to the present state of the simulation of the air traffic scenario or to the controller command and issues a warning upon the immediate or foreseeable failure to observe any rule or procedure in the knowledge base. The expert system may also include means for generating a verbal warning and an explanation of the warning in response to the expert system's issuing of a warning upon immediate or foreseeable failure to observe any rule or procedure in the knowledge base.

In this system, the training unit includes means for generating the representation of at least one moving aircraft having an initial position and heading for producing a dynamic simulation of an air traffic scenario. Means are provided for displaying the dynamic simulation and for entering a controller command from the user for altering the air traffic scenario. The unit further includes means for verbally acknowledging the controller commands in response to means for entering the controller command from the user. The training unit may further include control panel means and instrumentation means for enabling control of the means for displaying and for simulating the controls present in the work environment of an air traffic controller.

DISCLOSURE OF PREFERRED EMBODIMENTS

Other objects, features and advantages will occur from the following description of preferred embodiments and the accompanying drawings, in which.

Figure 7:
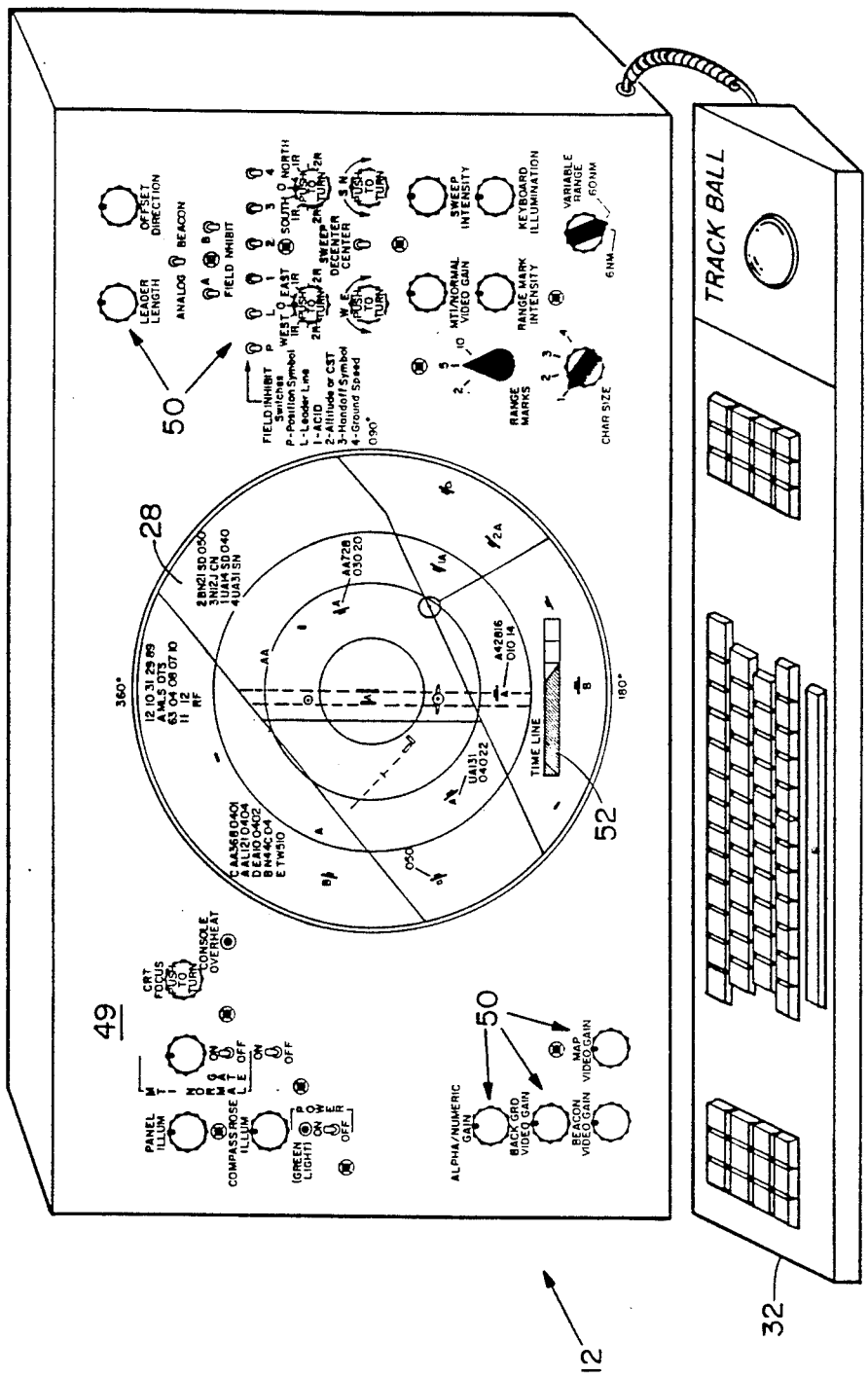
Figure 8:
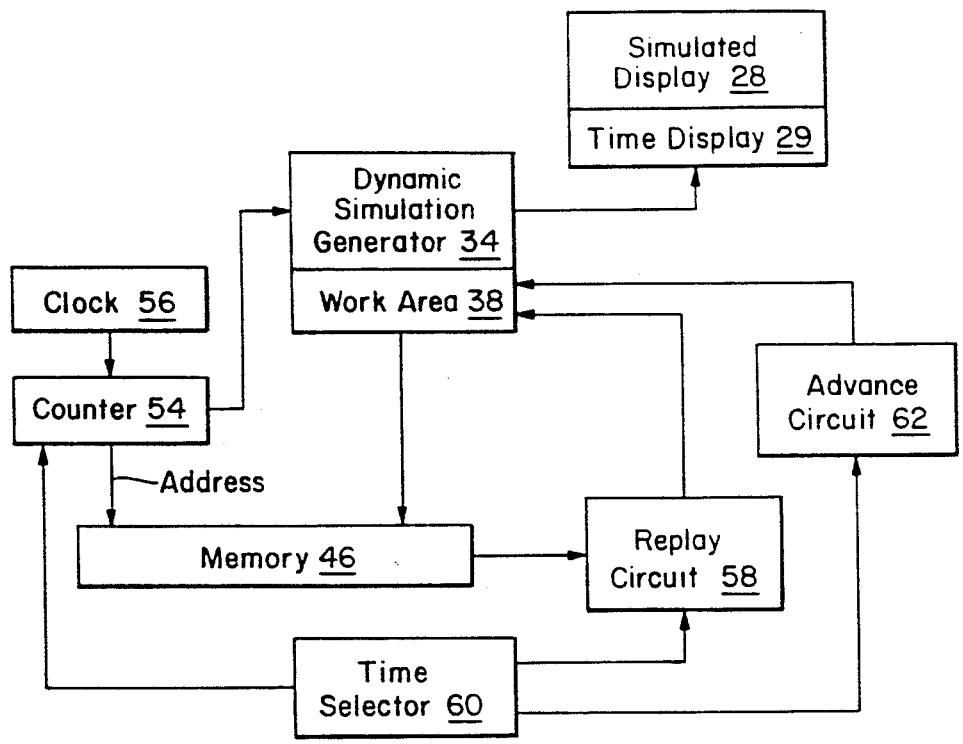
Figure 9:
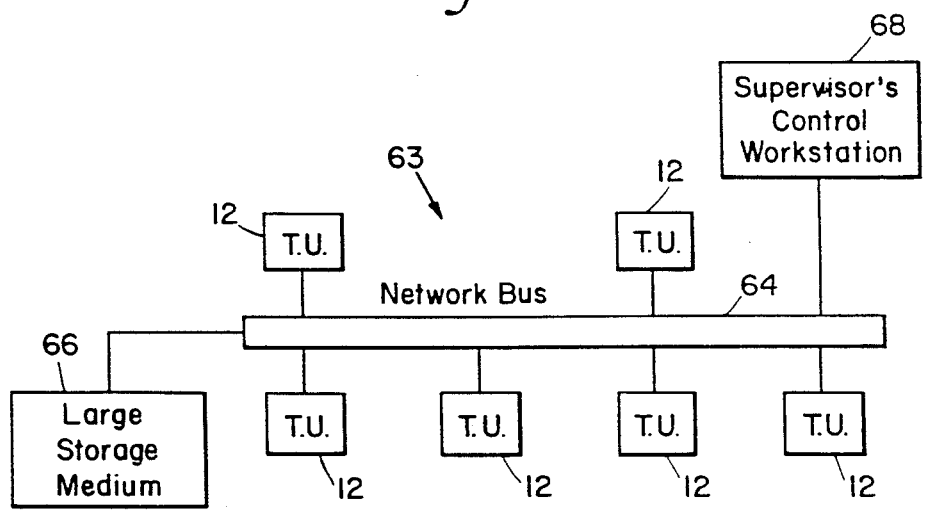
Figure 10:
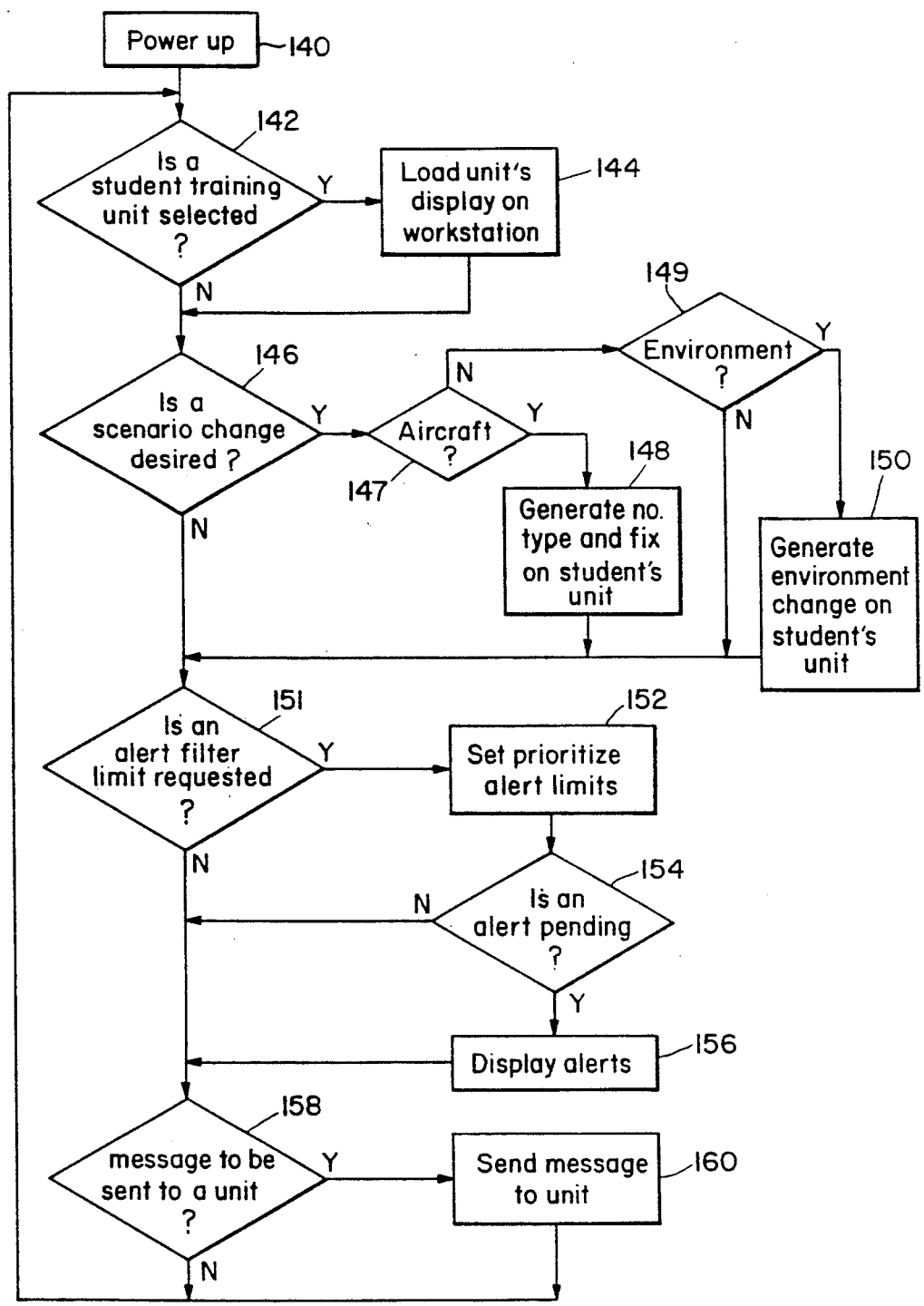

FIG. 7. is a front perspective view of the training unit showing a control panel and instrumentation;

FIG. 8 is a schematic block diagram illustrating the operation of a time line for replaying or advancing the scenario;

FIG. 9 is a schematic block diagram of a network of training units;

FIG. 10 is a flow diagram illustrating the operation of the instructor control workstation shown in FIG. 9.

Figure 1:
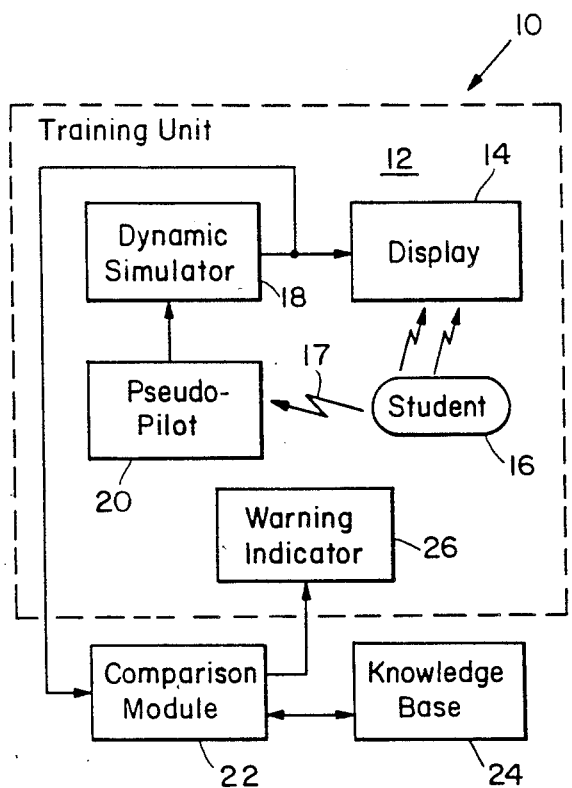
FIG. 1 is a schematic block diagram of a training unit according to this invention.

The invention can be accomplished by providing a training system 10 which would allow a student to interact with a training unit 12 system to change or alter air traffic scenarios while providing feedback that would normally be provided by an instructor. Training unit 12, shown in FIG. 1, includes a display 14 on which a student 16 observes an air traffic scenario that is generated by a dynamic simulator 18. As the scenario develops, student 16 issues verbal commands 17 to another person who acts as a pseudo-pilot 20 for feeding information into dynamic simulator 18 which alters the scenario according to the student's command. A comparison module 22 constantly monitors the information generated by dynamic simulator 18 for comparing the present state of the scenario to determine if a rule or procedure, stored in a knowledge base 24, is violated. Knowledge base 24 includes rules and procedures such as site-specific expert system letters of agreement, expert system standard operating procedures, or other expert systems such as *Air Traffic Control Handbook* rules. Knowledge base 24 also includes techniques of an expert air traffic controller for each scenario stored in library 80. If a rule or procedure is violated, comparison module 22 issues a warning to a warning indicator 26 which informs student 16 that a rule or procedure has been violated. If poor technique is demonstrated by the student 16 then comparison module would issue advice via warning indicator 26. For example, if separation is too great between aircraft a rule or procedure will not be violated but time and fuel may be wasted. Comparison module 22 would compare the student's control parameters with heuristic techniques for notifying the student of possible improvements. As another example, a recommendation could be made to improve the student's clearance commands to provide a smooth ride for passengers, i.e., avoid unnecessary speed changes, altitude changes, or heading changes. Thus, this system allows a trainee to compare his technique with that of an expert. This process is accomplished by storing the approach taken by an expert for that given scenario and comparing that approach to that of the student.

Figure 2:
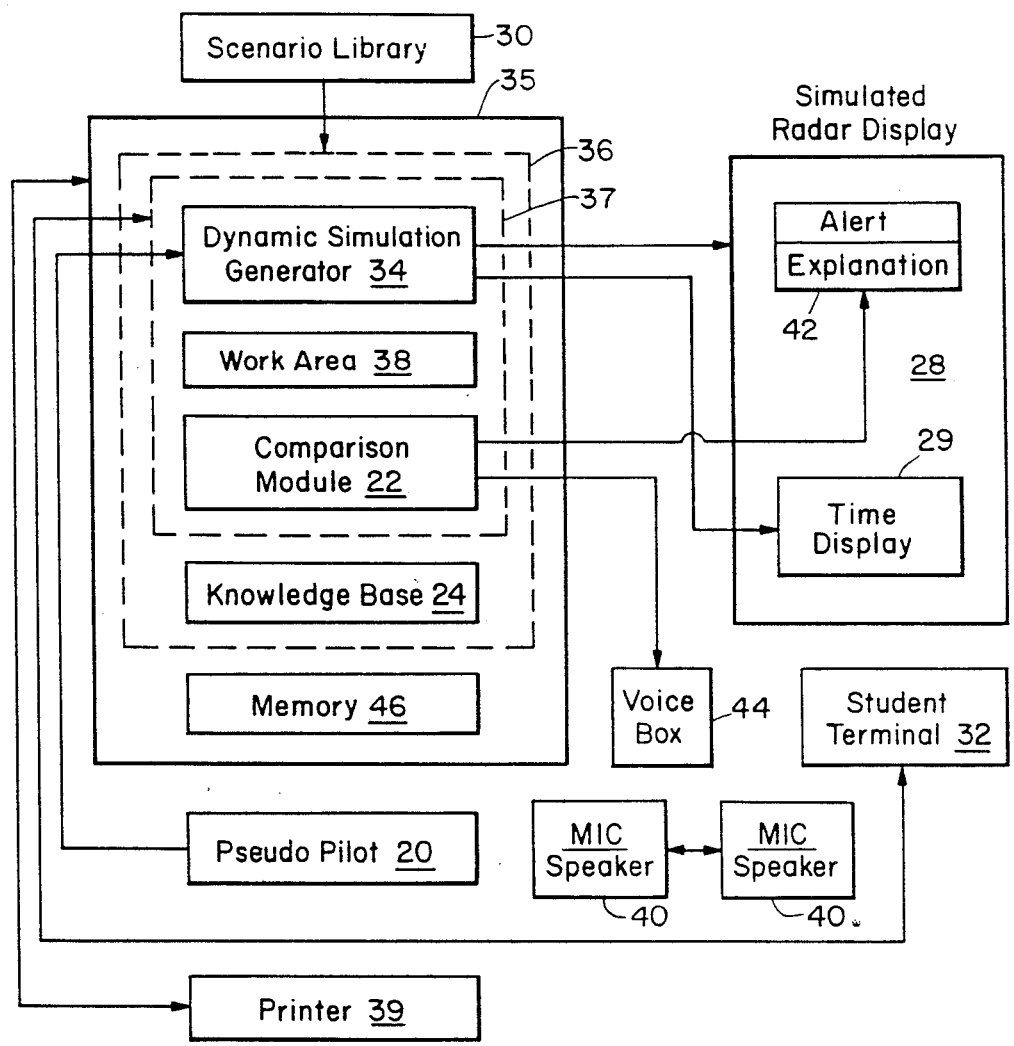
FIG. 2 is a schematic block diagram of the hardware components of the training unit according to this invention.

As illustrated in FIG. 2, system 10 includes a simulated radar display 28 for simulating the realtime radar display for a particular site. Display 28 may be generated using a standard piece of hardware 36 having high-resolution graphics, such as a SUN-AI or a DEC VAX AI workstation.

An air traffic control scenario is selected from a scenario library 30 by a student terminal 32 placed in front of the simulated radar display. Terminal 32 may be connected to a trackball, shown in FIG. 7, which is used for controlling a cursor, not shown. Preferably pop-up screens are used to list the selections for making a decision. Library 30 stores a variety of training scenarios that are scaled for beginners to experts. Scenarios may include circumstances which may rarely occur. The advantage of providing these types of scenarios is that the student can be trained to handle a variety of complex situations that may not otherwise occur during his on-the-job training.

Once an air traffic scenario is selected it is fed into an expert system 36 of a CPU 35. Expert system 36 includes an inference engine 37 and a knowledge base 24. Inference engine 37 consists of a dynamic simulation generator 34 for generating the scenario on simulated radar display 28 and a work area 38 which is used to update the scenario shown on display 28. Comparison module 22, within inference engine 37, calculates the present heading, speed, altitude, etc. for each aircraft before displaying the updated version on display screen 28. As the scenario develops, the student may react to aircraft shown on display screen 28 by issuing clearance commands for changing the flight pattern of a particular aircraft. These commands are verbally issued over a microphone and a speaker assembly 40 which informs pseudo-pilot 20 of the desired changes. Pseudo-pilot 20 enters these changes into dynamic simulation generator 34, which then updates the parameters of the scenario in work area 38. Pseudo-pilot 20 may then acknowledge these changes back to the student over microphone and speaker arrangement 40 for simulating a typical response from an aircraft pilot.

When work area 38 is updated, comparison module 22 compares the present state of the scenario with the knowledge base to determine if a rule or procedure is violated or if poor technique is demonstrated. If a violation occurs, comparison module 22 issues a warning to the student by generating an instructor's window 42 on simulated radar display 28. The instructor's window 42 consists of an inset on the display which includes an alert message that a rule or procedure is violated and an explanation of the violation. The explanation may include the text of the rule or procedure that was violated or make recommended courses of action. Alternatively, the comparison module may issue in conjunction with the instructor's window a warning over a voicebox 44 which essentially reads the contents displayed in the instructor's window. This allows the student to continually focus his attention on the developing air traffic scenario. In the preferred embodiment, the entire session is recorded in a memory 46. Clearances issued by the student and warnings issued by comparison module 22 are recorded as they occur. This allows a student or an instructor to later review the session on simulated radar display 28 or on a hard copy provided by a printer 39.

Figure 3:
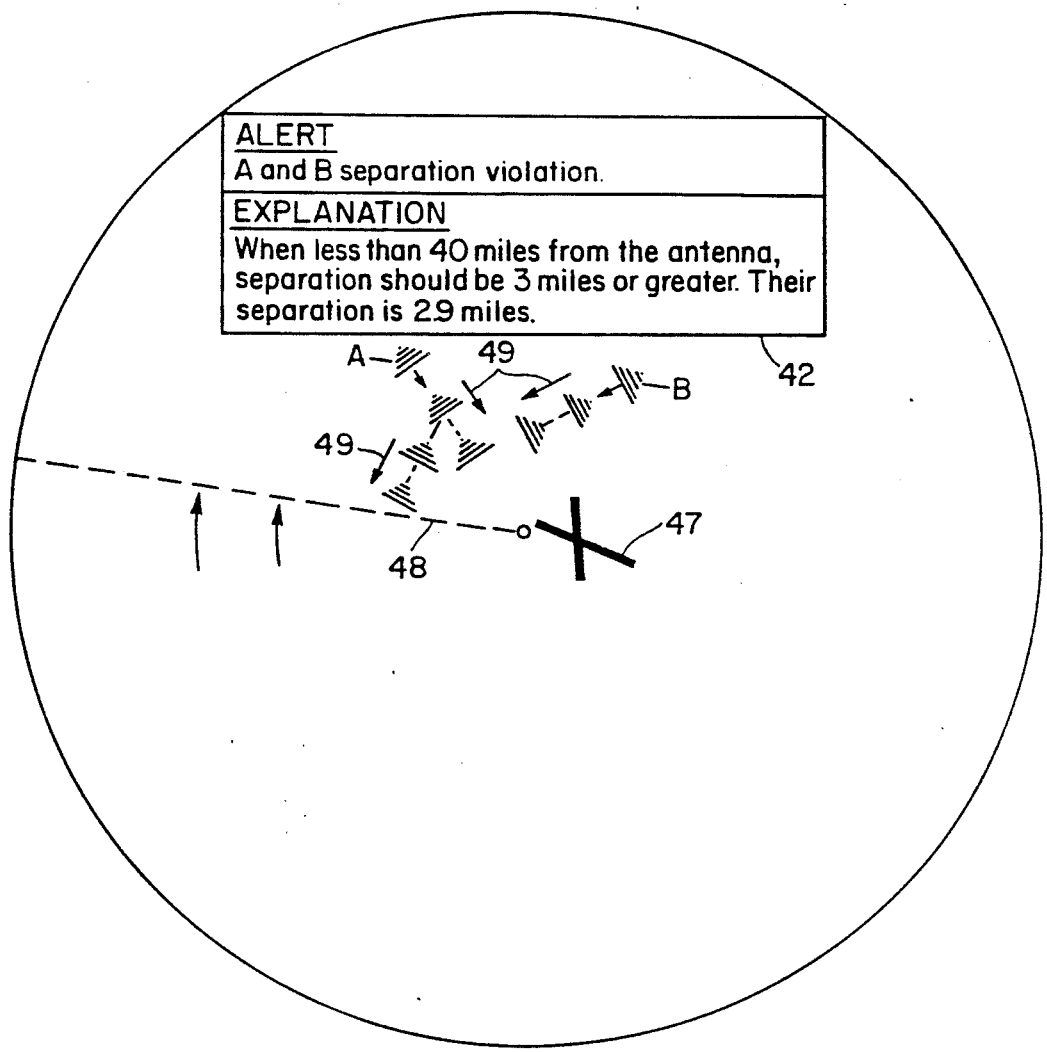
FIG. 3 is an illustration of a radar screen showing the flight pattern of two aircraft.

As a simple illustration, an air traffic scenario is shown in FIG. 3. The simulation includes a radar sweep 48 that tracks two aircraft A and B located in different geographical regions of the controller's sector as it passes over that region. The flight pattern of each aircraft is dynamically controlled by the operator. In other words, once the aircraft becomes visible on the simulated radar screen, it is up to the student to control its flight pattern in order to safely land that aircraft on runway 47. Whenever the radar sweep tracks an aircraft, the aircraft's heading and position is updated according to its previous flight pattern or by a recent student clearance command. If the student does nothing, the airplane will continue on its original path as indicated by arrows 49. By issuing a clearance command, the course of the aircraft is changed. This new course for this aircraft will continue at the same heading, speed, altitude, etc. as instructed by the student until such time as another clearance command is issued. As the scenario is updated, comparison module 22 compares the data for the present state of the scenario with the rules, procedures, and a record of the performance of an expert air traffic controller for that air traffic scenario in the knowledge base for possible violations. In the preferred embodiment, the alert is a short message that tells the controller that something is wrong, i.e., there is weight turbulence, noise abatement, separation, etc. The explanation includes a message that explains why there was a violation by citing the particular rule violated. For this case expert system 22 generated a warning in instructor's window 42 alerting the student that aircraft A and B violated a separation rule and cited the rule.

Figure 4:
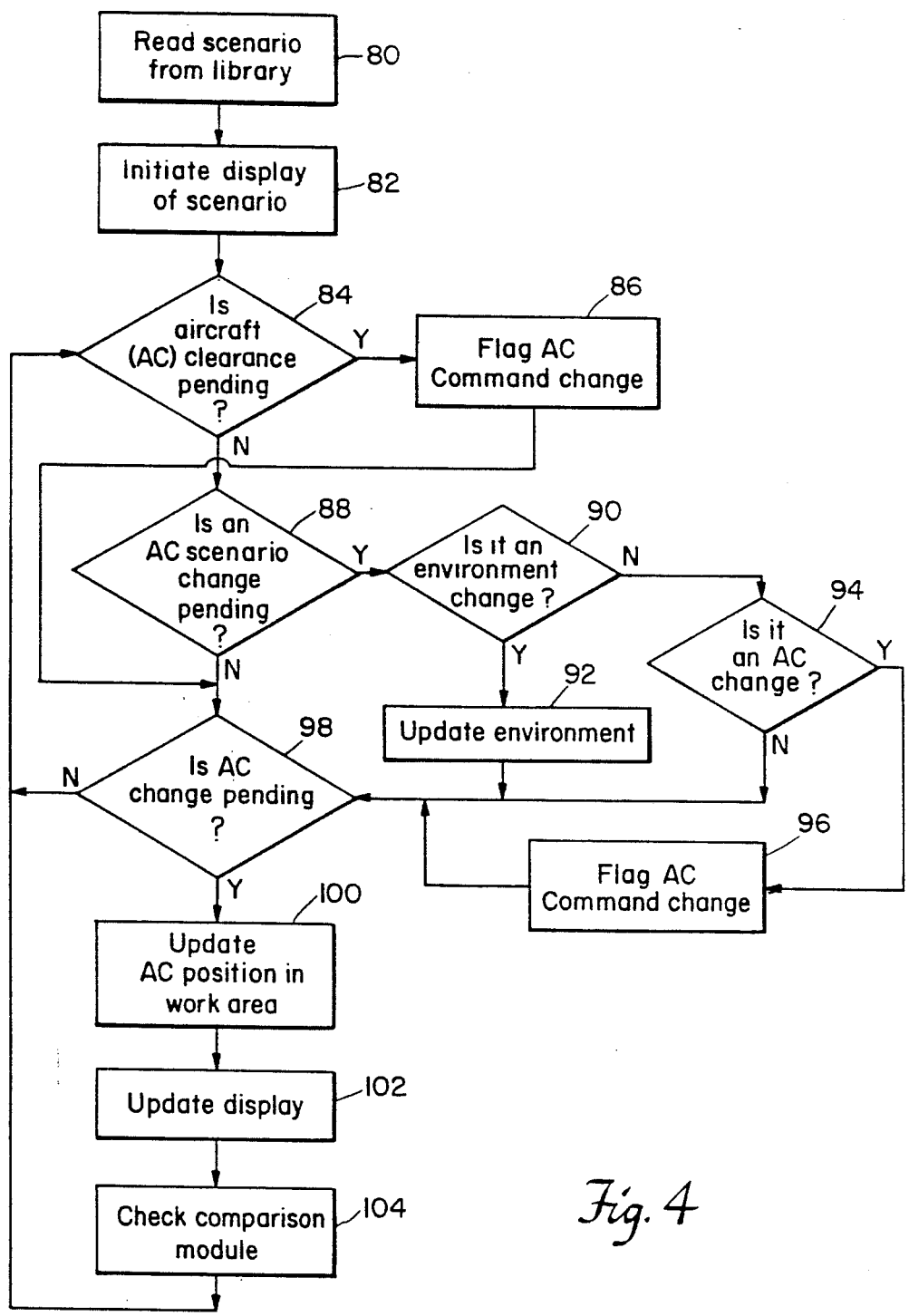
FIG. 4 is a flow diagram illustrating the operation of the simulation generator shown in FIG. 2.

The operation of dynamic simulation generator 34 is illustrated in FIG. 4. After the student has chosen a scenario from the scenario library, the scenario is loaded into the simulator generator, step 80, which processes the stored information and initiates the scenario on the simulated radar display screen, step 82. The simulation generator then determines whether a controller clearance is pending for an aircraft tracked by the radar sweep, step 84. If a command is pending, then generator 34 translates the command into an aircraft change instruction, step 86, which updates the position of the aircraft in the work area, step 100, and simultaneously updates the display, step 102. This update is then checked by comparison module 22 for possible violations before returning to see if another control clearance is pending, step 104.

For cases where there are no controller clearances pending, simulation generator 34 checks to see if there is a scenario change, step 88. If there is a scenario change, the simulation generator determines whether it is an environmental change or an aircraft change, steps 90 and 94. For example, the stored scenario may introduce a weather change or another aircraft onto the radar display. These pending changes are then translated into instructions for updating the scenario steps 92 and 96. If an aircraft change was pending, the comparison module 22 checks the updated data of the work area of the generator for possible violations, step 104; otherwise the simulator generator returns to determine if a controller clearance is pending for the next aircraft under consideration.

Figure 5:
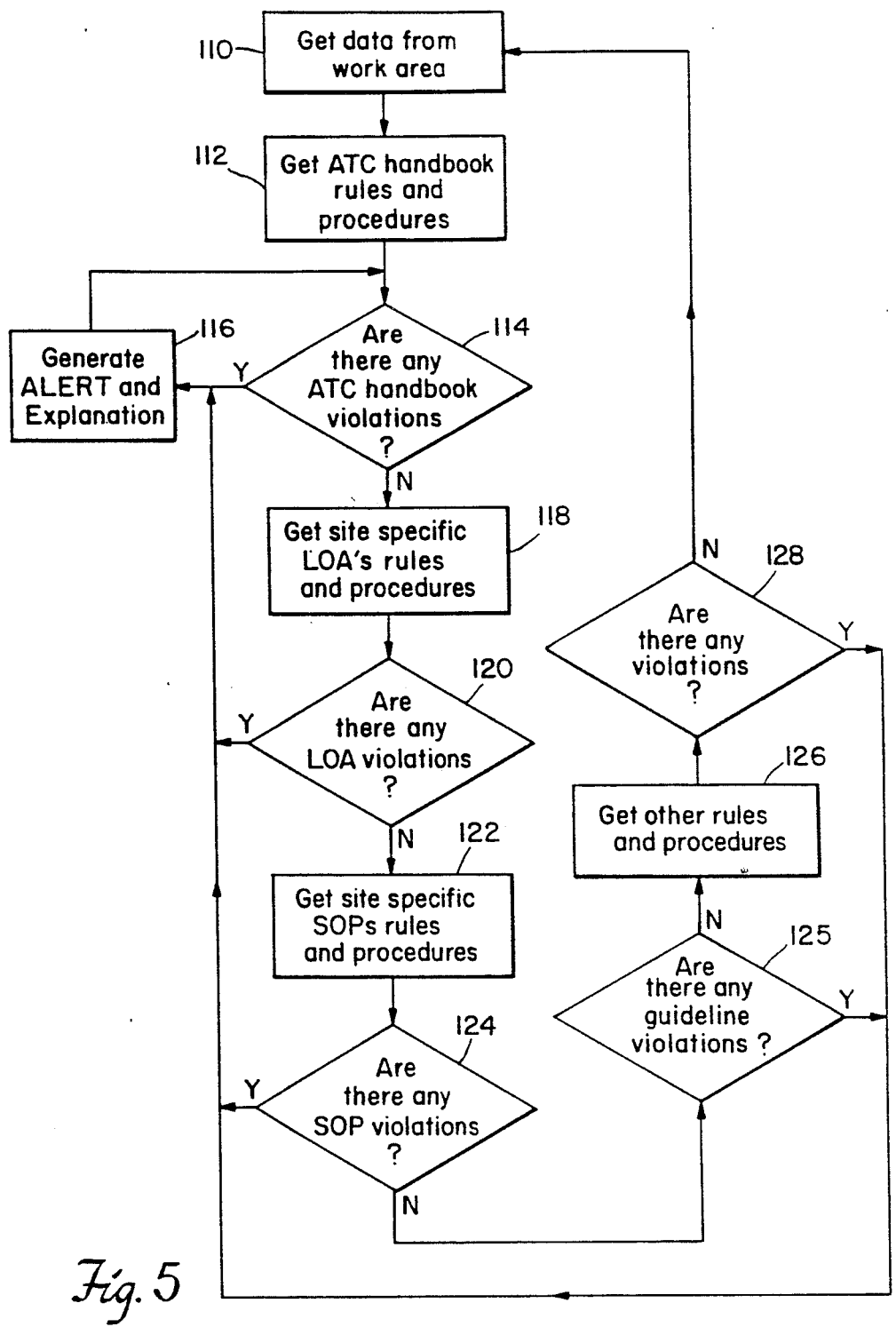
FIG. 5 is a flow diagram illustrating the operation of the comparison module shown in FIG. 2.

As demonstrated by the simulation generator flowchart, a call to the comparison module is initiated whenever an aircraft is updated. Comparison module 22 receives data from the work area of the generator and compares this data with data stored in the knowledge base. As shown in FIG. 5, the operation of the comparison module is illustrated by a flowchart. By way of example, data received from work area 38, step 110, is first compared with *ATC Handbook* rules and procedures for possible violations, step 112. The *ATC Handbook* is a government handbook for air traffic controllers which contains rules which apply to every airport facility in the country. These rules may be replaced with rules and procedures for different countries. If it is determined that a rule has been violated, comparison module 22 causes the simulated radar screen to display an alert message and an explanation of the alert in the instructor's window, step 116. Other violations, such as site-specific letters of agreement violations, standard operating procedure violations, etc. are similarly checked and processed by the expert system before more data is retrieved from the work area, steps 118-128. If there are no rules or procedures violated, expert operating procedures for that scenario are compared, step 125, to take advantage of a heuristic approach for teaching the student. If the student's command exhibits a poor technique a guidance message will be issued via the instructor's window 42, step 116.

Figure 6:
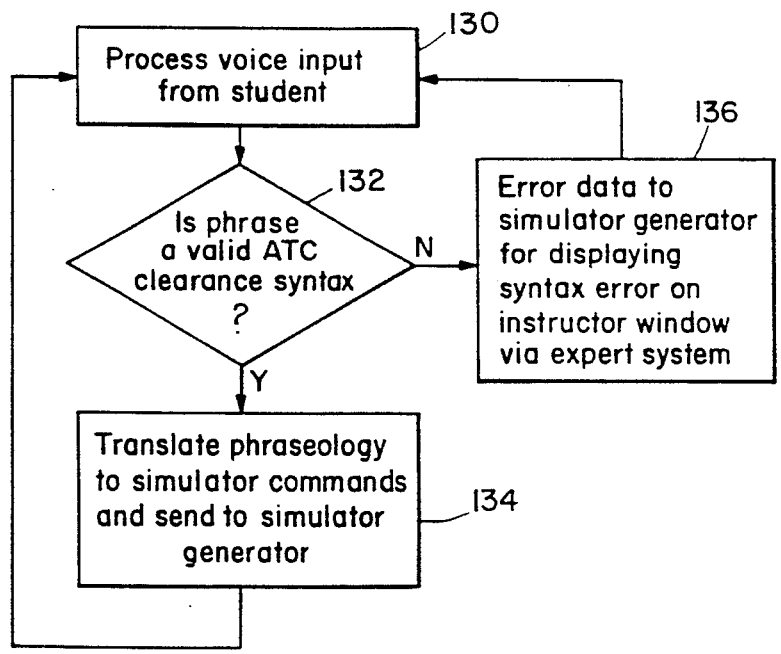
FIG. 6 is a flow diagram illustrating the operation of a voice recognition pseudo-pilot.

In another embodiment, data may be entered into the simulator generator by a pseudo-pilot that consists of a voice recognition system which translates the voice of the student controller into digitized signals that are recognized by simulation generator 34 as command instructions. A flowchart providing an example for such a system is illustrated in FIG. 6. Referring to the flowchart, the voice recognition system processes the student's verbal commands, step 130, which are in terms of air traffic control clearance phrases recognized by the industry. The system first tests to see if the phrase is a valid phrase, step 132. If the phrase has been worded incorrectly, an error message is sent to comparison module 22 via the simulation generator 34 for displaying the error in the instructor's window 42, step 136. Alternatively the student can be alerted by way of the voice synthesizer. The pseudo-pilot voice-recognition system then waits for the next input from the student step 130. For a valid air traffic control clearance command, the voice-recognition system translates the phraseology into proper control signals for updating the simulation generator 34 and the work area 38, step 134.

In an alternative embodiment, the pseudo-pilot may be equipped with a touch-sensitive screen which allows a person acting as a pseudo-pilot to quickly update the scenario. This allows the pseudo-pilot to handle more complex air traffic situations without requiring a second pseudo-pilot.

As shown in FIG. 7, the entire workstation of an air traffic controller is simulated. In addition to display screen 28, training unit 12 includes a control panel 49. Panel 49 may be controlled by a standard PC such as an IBM Personal Computer for allowing the student Lo control the knobs and levers 50 associated with the simulated radar display for simulating the real environment of, the air traffic control station. For example. Other knobs may be used for one knob may be used for controlling the intensity of the screen, increasing or decreasing the area displayed by the radar simulator or offset direction. The control panel together with the graphic display screen can be arranged to simulate any air traffic control work station that is currently being used.

Training unit 12 also includes a time line 52 on the radar simulator indexing the scenario as it develops. Time line 52 serves as a marker so that if a student or instructor wishes to view the consequences of a student's clearance command, a future point can be referenced for accelerating the scenario. In addition, time line 52 can serve as a marker for replaying a portion of the scenario.

The time indicated on time line 52 is generated by a counter 54, FIG. 8, which is driven by a clocking device 56 such as a crystal. The count generated by counter 54 is used by simulation generator 34 for displaying time on an inset on simulated radar display 28. The count of the counter is stored in memory 46 together with data in work area 38 for indexing the scenario in memory as it is recorded. When the student or instructor selects to replay the scenario, a replay circuit 58 is enabled by a time selector 60. The time selector 60 may be controlled by the student's terminal 32. The scenario is replayed by resetting the count on the counter which addresses the memory for selectively feeding back into the work area the stored scenario corresponding to the count on the counter. The recorded scenario is then displayed via dynamic simulator generator 34. Time selector 60 also resets the time displayed on simulated display 28.

If the student or instructor selects to advance the circuit, time selector 60 advances counter 50 and enables advance circuit 62. Advance circuit 62 causes work area 38 to advance the scenario to some predetermined period of time by using the current data for each aircraft in the work area to determine each aircraft's future position. This advance scenario is then displayed on simulated radar screen 28 via dynamic simulator generator 34.

In another embodiment, the air traffic training system can be expanded to a network 63 which includes a plurality of student training units 12 as shown in FIG. 9. Training units 12 are connected together by a broadband network bus 64 such as Ethernet or other network system. This network allows voice, video, and computer data to pass over bus 64. In this embodiment, the expert system and the knowledge base can be stored on a large storage medium 66 such as an optical Write Only Read Mostly (WORM). This storage medium may also be used to store the library of scenarios as well as the complete history of each training session for each student. With such a network, each student can learn the valuable lesson of teamwork by learning to hand off control of aircraft in their control sector to other students controlling different sectors. In other words, network 63 can simulate the whole air traffic control system with each training unit simulating a different geographical section of the system network. Thus the system gives the ability to provide different levels of terminal control as would be seen in a normal controller environment. For example, the network may include a departure terminal, arrival terminal and en route control stations.

Network system 63 also includes a supervisor's control workstation 68. Supervisor's control workstation 68 is similarly connected to other student training units 12 over network bus 64. In the preferred embodiment, supervisor's control workstation 68 is similar to the student's training unit 12, except that it can monitor or change the scenario displayed by any of the training units. In other words, supervisor's control workstation 68 can selectively change the environments or scenarios of any or all of the student training units 12. Workstation 68 can also request all of the alerts that have been issued by any of the individual training units or replay any of the scenarios.

A flowchart illustrating the operations of an instructor control workstation is shown in FIG. 10. After being powered up, step 140, the workstation determines if an instructor has requested to monitor a particular training unit 12, step 142. The scenario displayed on that unit is then displayed by tying into that unit's dynamic simulation generator via network bus 64, step 144. The workstation 68 then looks to see if a scenario change, is desired by the operator, step 146. For example, the operator can introduce introducing additional aircraft or environmental changes, steps 147-150. Changes are made by sending the proper commands to that unit's dynamic simulation generator, step 148. Workstation 68 also determines if the operator has requested alert messages that have been issued by one or more units, step 151. The workstation may be flagged as alerts occur at the individual training units. These alerts are prioritized, step 152, and then displayed on the simulated radar screen of the workstation, steps 154 and 156, indicating which units had issued the alerts. Supervisor's workstation 68 may then determine if the operator wishes to send a message to one or all of training units 12, steps 158 and 160. Other tasks may also be performed by workstation 68, such as recalling and replaying a stored training session or updating the library of stored scenarios.

An air traffic control training system according to this invention can provide great versatility. For example, the scenario library may store two types of training exercises, one for teaching the student approach control, the other departure control. If the student is being trained for departure, then approaching aircraft will properly land itself without instructions from the student. Alternately, for training a student for approaches all departures will leave according to the proper order or sequences. The student controller must then dodge the departures safely. In this type of scenario the departure may leave the runway, climb to a standard altitude, and from there the student controls its flight pattern.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A traffic control training system for interacting with a user, comprising:

means for generating a representation of at least one moving vehicle having an initial position and heading for producing a dynamic simulation of a traffic scenario;

means for entering a controller command from the user for altering the traffic scenario simulation;

a knowledge base for storing accepted rules and procedures applicable to the traffic scenario simulation; and a comparison module for comparing the rules and procedures to at least one of the present state of the simulation of the traffic scenario and the controller command and for issuing an alert upon the immediate and foreseeable failure of the user to observe any rule or procedure in the knowledge base.

2. The system of claim 1 in which said means for generating includes simulated display means for displaying the dynamic simulation of the traffic scenario.

3. The system of claim 2 in which said means for displaying further includes means for generating an inset for displaying the alert issued by said system.

4. The system of claim 3 in which said system includes means for generating and displaying a warning message and an explanation of the warning message within the inset.

5. The system of claim 1 in which said knowledge base includes a record of the performance of an expert traffic controller for the traffic scenario and said comparison module compares the record for generating instructions to the user.

6. The system of claim 1 in which said system further includes means for producing a verbal alert for informing the user that a rule or procedure has been violated.

7. The system of claim 1 in which said means for entering further includes pseudo-pilot means, interconnected to said means for generating, for responding to verbal commands issued by the user for altering the traffic scenario simulation.

8. The system of claim 7 in which said pseudo-pilot means includes voice recognition means for electronically responding to verbal commands issued by the user to alter the traffic scenario simulation.

9. The system of claim 7 in which said pseudo-pilot means includes a terminal having a touch-sensitive screen for entering the controller commands by a person responding to verbal commands issued by the user.

10. The system o claim 7 in which said pseudo-pilot means further includes voice synthesizing means controlled by said system for verbally acknowledging controller commands.

11. The system of claim 1 in which said means for generating further includes:

means for displaying the dynamic simulation of the traffic scenario; and control panel means and instrumentation means for enabling control by the user of said means for displaying and for simulating the controls present in the work environment of a traffic controller.

12. The system of claim 1 further including storage means for storing the dynamic simulation of the traffic scenario together with the controller commands as they are issued by the user during the simulation and the alerts issued by said system.

13. The system of claim 1 in which said means for generating further includes:

means for displaying the traffic scenario simulation;
means for establishing an inset on said means for displaying;

clock means for generating time increments to index the generated traffic scenario simulation; and means for representing the generated time increments within the inset on said means for displaying.

14. The system of claim 13 further including: storage means, responsive to said clock means, for storing the traffic scenario simulation; and means for addressing a selected time increment to replay the scenario on said means for displaying.

15. The system of claim 13 in which said means for generating further includes means for advancing the traffic scenario simulation to a predetermined increment of time.

16. The system of claim 1 further including a printer for providing a hard copy of the dynamic simulation.

17. A traffic control training system for interacting with at least one user, comprising:

at least one training unit including:

means for generating a representation of at least one moving vehicle having an initial position and heading for producing a dynamic simulation of a selected traffic scenario;

means for displaying said dynamic simulation of the traffic scenario; and means for entering a controller command from the user for altering the traffic scenario simulation;

a knowledge base for storing accepted rules and procedures applicable to the traffic scenario simulation; and a comparison module for comparing the rules and procedures to at least one of the present state of the simulation of the traffic scenario and the controller command and for issuing an alert upon the immediate and foreseeable failure of the user to observe any rule or procedure.

18. The system of claim 17 in which said knowledge base includes a record of the performance of an expert traffic controller for the traffic scenario and said comparison module compares the record for generating instructions to the user.

19. The system of claim 17 further including:

a plurality of training units;

a network bus for interconnecting said plurality of training units; and a supervisor unit interconnected to said plurality of training units over said network bus, said supervisor unit including means for selectively displaying the traffic scenario simulation selected at each of said plurality of training units.

20. The system of claim 19 further including means for entering a supervisor command for altering the traffic scenario simulation displayed on said means for displaying at one or more of said plurality of training units.

21. The system of claim 19 in which said supervisor unit further includes means for detecting warnings issued at any of said plurality of training units.

22. The system of claim 17 in which said means for displaying at each of said plurality of training units further includes means for generating an inset for displaying the alert issued by said system.

23. The system of claim 22 in which said system includes means for generating and displaying a warning message and an explanation of the warning message within the inset at each of the plurality of training units.

24. The system of claim 17 wherein said system further includes means for producing a verbal warning for informing the suer that a rule or procedure has been violated.

25. The system of claim 17 in which said means for entering further includes pseudo-pilot means interconnected to said means for generating for responding to verbal commands issued by the user to alter the traffic scenario simulation.

26. The system of claim 25 in which said pseudo-pilot means include voice recognition means for electronically responding to verbal commands issued by the user for altering the traffic scenario simulation.

27. The system of claim 25 in which said pseudo-pilot means include a terminal having a touch-sensitive screen for entering the controller commands by a person responding to verbal commands issued by the user.

28. The system of claim 25 in which said pseudo-pilot means further include voice synthesizing means controlled by said system for verbally acknowledging controller commands.

29. The system of claim 17 in which said means for generating further includes control panel means and instrumentation means for enabling control of said display by the user and for simulating the controls present in the work environment o a traffic controller.

30. The system of claim 17 in which said means for generating further includes:
 means for generating an inset on said means for displaying;
 clock means for generating time increments to index the generated traffic scenario; and
 means for representing the generated increments of time within the inset on said means for displaying.

31. The system of claim 30 further including:
 storage means responsive to said clock means for storing the traffic scenario simulation time increments; and
 means for addressing a selected time increment to replay the scenario simulation on said means for displaying.

32. A traffic control training system for interacting with a user, comprising:
 a training unit including:
 means for generating a representation of at least one moving vehicle having an initial position and heading for producing a dynamic simulation of a selected traffic scenario;
 means for displaying said dynamic simulation of the traffic scenario;
 means for entering a controller command from the user for altering the traffic scenario simulation; and
 means for verbally acknowledging controller commands in response to means for entering a controller command from the user;
 a knowledge base for storing accepted rules and procedures applicable to the traffic scenario simulation; and
 an expert system for comparing the rules and procedures to at least one of the present state of the simulation of the traffic scenario and the controller command and for issuing a warning upon immediate and foreseeable failures of the user to observe any rule or procedure in the knowledge base.

33. The system of claim 32 in which said system further includes means for generating a verbal warning and explanation of the warning in response to said system issuing a warning upon the immediate or foreseeable failure to observe any rule or procedure in the knowledge base.

34. The system of claim 32 in which the training unit further includes control panel means and instrumentation means for enabling control of said means for displaying by the user and for simulating the controls present in the work environment of a traffic controller.

35. A method for training traffic controllers on a traffic control training system for interacting with a user, comprising:
 generating a representation of at least one moving vehicle having an initial position and heading for producing a dynamic simulation of a traffic scenario;
 entering a controller command from the user for altering the traffic scenario simulation;
 providing a knowledge base for storing accepted rules and procedures applicable to the traffic scenario simulation;
 comparing the rules and procedures to at least one of the present state of the simulation of the traffic scenario and the controller command; and
 issuing a warning upon the immediate and foreseeable failures of the user to observe any rule or procedure in the knowledge base.

36. The method of claim 35 in which generating further includes displaying the dynamic simulation of the traffic scenario on a simulated display.

37. The method of claim 35 in which generating further includes:
 generating an inset on the simulated display;
 generating time increments to index the generated traffic scenario; and
 representing the generated measurements of time within the inset of the simulated display.

38. The method of claim 37 further including:
 storing the traffic scenario time increments in response to generating time increments; and
 addressing a selected time increment to replay the scenario on the simulated display.

39. The method of claim 35 in which the step of comparing further compares a record of the performance of an expert traffic controller to the traffic scenario.

40. The method of claim 39 in which said step of issuing a warning further includes the step of generating instructions to the student.

41. A traffic control training system for interacting with a user, comprising:
 means for generating a representation of at least one moving vehicle having an initial position and heading for producing a dynamic simulation of a traffic scenario;
 means for entering a controller command from the user for altering the traffic scenario simulation;
 a knowledge base for storing accepted rules and procedures applicable to the traffic scenario simulation including a record of the performance of an expert traffic controller for the traffic scenario; and
 a comparison module for comparing the rules and procedures to least one of the present state of the simulation of the traffic scenario, the performance of the expert traffic controller, and the controller command, for issuing an alert upon the immediate foreseeable failure of the user to observe any rule or procedure in the knowledge base and for generating instructions to the user.

42. A traffic control training network comprising:
 a plurality of training units, each of said training units including:

means for generating a representation of at least one moving vehicle having an initial position and heading for producing a dynamic simulation of a selected traffic scenario;

means for displaying said dynamic simulation of the traffic scenario; and means for entering a controller command from a user for altering the traffic scenario;

a knowledge base for storing accepted rules and procedures applicable to the traffic scenario simulation;

a comparison module, interconnected to said knowledge base and each of said training units, for comparing the rules and procedures to at least one of the present state of each traffic scenario simulation and the controller command, for issuing an alert upon immediate and foreseeable failures of the user to observe any rule or procedure, and for generating and displaying a warning message and an explanation of the warning message on said means for displaying; and a network bus for interconnecting said plurality of training units.

43. The system of claim 42 further including a supervisor unit interconnected to said plurality of training units over said network bus, said supervisor unit including means for selectively displaying the traffic scenario selected at each of said plurality of training units.

* * * * *

UNITED STATES PATENT AND TRADEMARK OFFICE
CERTIFICATE OF CORRECTION

PATENT NO. : 4,979,137

DATED : December 18, 1990

INVENTOR(S) : Arthur Gerstenfeld et al.

It is certified that error appears in the above-identified patent and that said Letters Patent is hereby corrected as shown below:

Column 9, line 5, change "Lo" to --to--;

line 8, change "For example." to --For example,--;

line 9, delete "Other knobs may be used for"; and line 10, after "screen" insert --. Other knobs may be used for--.

Column 10, line 29, delete "introducing".

Signed and Sealed this

Sixth Day of October, 1992

Attest:

DOUGLAS B. COMER

Attesting Officer

Acting Commissioner of Patents and Trademarks